Figure 1:
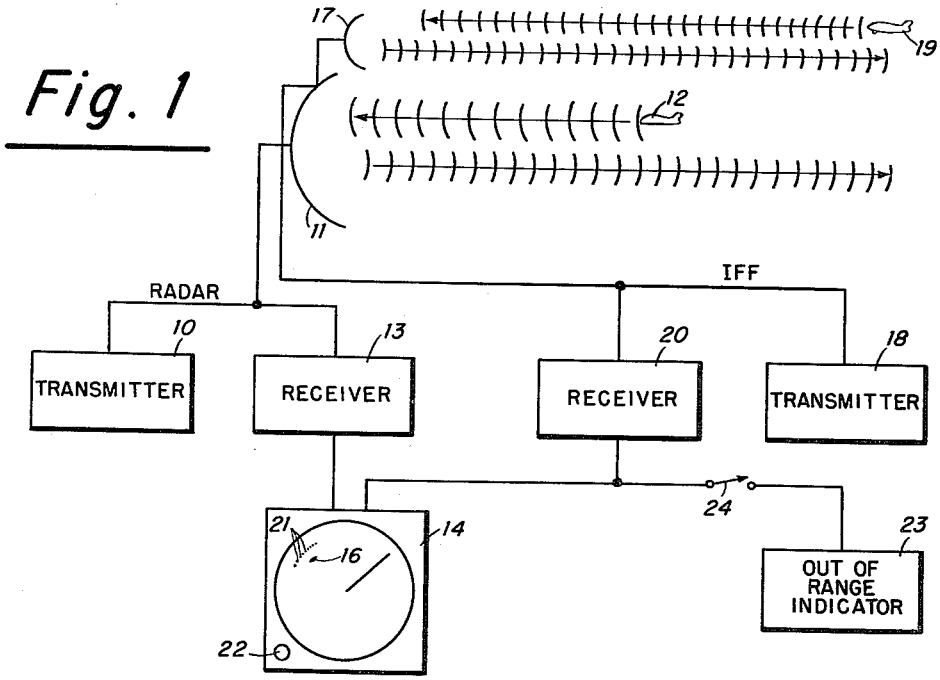

July 31, 1962 C. W. ROCKETT ETAL 3,047,857
EMERGENCY INDICATOR ALARM
Filed Nov. 30, 1955

INVENTORS
CHARLES W. ROCKETT
LAWRENCE N. HIGGINS
BY VERNON E. TERP

ATTORNEYS 3,047,857
EMERGENCY INDICATOR ALARM
Charles W. Rockett, United States Navy, and Lawrence N. Higgins and Vernon E. Terp, San Diego, Calif.
Filed Nov. 30, 1955, Ser. No. 550,224
5 Claims. (Cl. 343—6.5)
(Granted under Title 35, U.S. Code (1952), sec. 266)

The invention described herein may be manufactured and used by or for the Government of the United States of America for governmental purposes without the payment of any royalties thereon or therefor.

This invention relates to detection devices and more particularly to a detection device which will indicate the presence of a target even beyond the range of a visual indicator such as a radar scope which has been adjusted for operation at a shorter than maximum range.

In certain applications of radar and other echo ranging devices, the visual indicating means is shortened to a smaller range than maximum for tracking and other purposes while the transmitter and receiver are still operating for target detection at the normal maximum range. In emergency situations, a friendly target beyond the shorter range yet within the maximum range of the equipment desires to make its presence known to the operator of the equipment. Such situations might arise if the target is disabled and needs assistance or if it is lost and desires to have a range and bearing transmitted to it. The indicator device included in this invention is used in conjunction with standard radar and IFF equipment which may be used without modification by connecting such indicator to the output of the IFF receiver and in parallel with the visual indicating scope.

Heretofore, there are no known devices or systems used in such combination to accomplish this result.

An object of this invention is the provision of an indicating device for use with present radar and IFF systems to indicate to the operator the presence of a friendly target within the maximum range of the equipment and beyond the range of the currently used shorter range on the visual indicator.

A further object is the provision of an indicator which will indicate only certain signals of specific characteristics and which will substantially eliminate false signals, spurious noises or signals possessing other characteristics.

Still another object of this invention is the provision of suitable filtering, discriminating, counting and other circuitry in an indicator to prevent the indication of signals other than those desired to be shown or registered by the indicator.

A further object is the provision of a novel application of certain principles and devices known per se in a novel combination for presenting an out-of-range indication of target presence.

Figure 2:
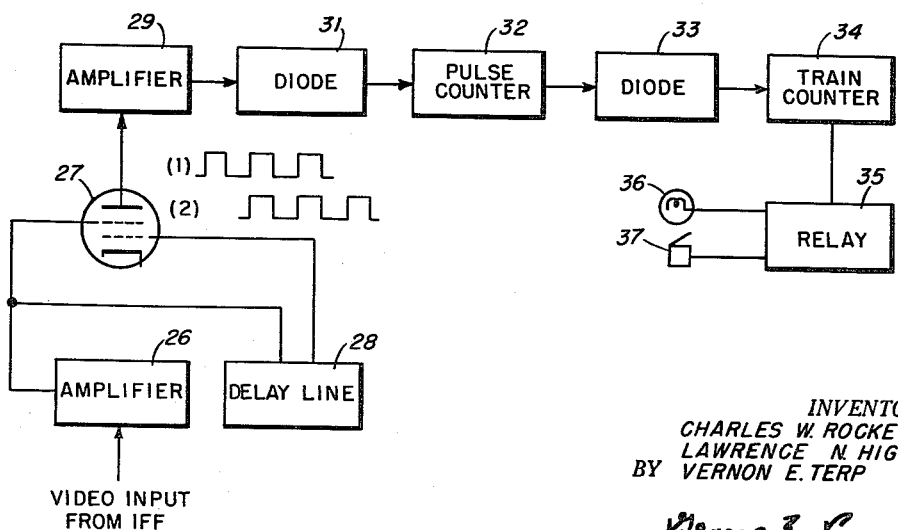

Other objects and many of the attendant advantages of this invention will be readily appreciated as the same becomes better understood by references to the following detailed description when considered in connection with the accompanying drawings wherein:

FIG. 1 is a symbolic presentation of the system showing the combination of the indicator and the currently used radar and IFF equipment; and FIG. 2 is a block diagram of the circuitry included in the indicator shown in FIG. 1.

Referring now to the drawing wherein like numerals designate like parts, there is shown in FIG. 1 the radar transmitter 10 which sends out pulses on antenna 11 which strikes a target within its maximum range. When these signals strike a target such as 12 the echo signals are returned back to antenna 11 where they are carried to receiver 13. Within receiver 13, suitable circuitry converts these pulses into a video input signal which is fed into the visual indicating scope 14 where it is registered on the scope, for example, as target 16. When IFF systems are used in conjunction with this radar, a second antenna 17 is used in conjunction with antenna 11. This antenna sends out a signal from IFF transmitter 18 to the target which indicates to the target that an IFF signal is expected back in return. Target 19 is such a target within the maximum operating range of the IFF and radar equipment. This target originated signal, picked up by antenna 17, is fed into IFF receiver 20 where it is transformed into suitable video signals to be indicated on visual indicating scope 14. The requested IFF information, for example, may be a plurality of dots 21. If range selector 22 has been so adjusted that the video presentation in scope 14 is registering only from a shorter range than the maximum, as is sometimes desirable, the IFF signals from target 19 beyond the range of the scope 14, yet within the range of the IFF equipment could be registered and the operator would be unaware of the presence of such targets. An out-of-viewing-range indicator 23 is connected to the output of the receiver 20 ind in parallel with the viewing means 14 by switch 24, which, when closed, will cause energization of indicator 23 and an alarm, light, or other suitable signal to indicate to the operator the presence of such target. FIG. 2 shows a block diagram of the indicator 23 wherein the video input from the IFF receiver 20 is amplified at amplifier 26 where it is then sent to coincidence tube 27 and delay line 28. The emergency signal from target 19 may consist of, for example, a plurality of pulses spaced uniformly apart, shown as pulse train (1) in the drawing. The delay line 28 receives the same signal and delays it by one unit of spacing between the pulses and then feeds into the coincidence tube the same pulses in train (2) delayed by that amount of time. The coincidence circuit includes, besides delay line 28, a coincidence vacuum tube having two grids, one being energized by the first train and the second grid energized by the second train. Only when both grids are simultaneously energized will the vacuum tube then conduct a flow of electrons to the amplifier 29. The first pulse in the first train and the last pulse in the second train would not activate the tube. Amplifier 29 then amplifies the remaining pulses in each train which coincide and send these pulses through diode 31. Multi-pulse counter 32 sends out one pulse for every group of pulses received. This one pulse then passes through diode 33 into the train counter 34. The multitrain counter 34 is similar to the multi-pulse counter 32 in that it requires a predetermined number of pulses from the diode 33 before it will release energy to activate relay 35. Relay 35 then causes light 36 or buzzer 37 to be activated thereby notifying an operator that an emergency IFF signal is being received from a friendly target 19. An operator will then turn range selector knob 22 so that he may view all targets within maximum range and thus be able to observe target 19 which initiated the emergency alarm. Since not only the target but its IFF signal would also be registered on the visual detection scope 14, the operator then can track this target, giving it requested range and bearing or send assistance as desired. While the indicator comprising this invention has been described as a means of indicating targets beyond the range of a viewing means indicator, it is readily apparent that its usefulness may become manifest under other circumstances. Obviously, the friendly target 19 could actuate the indicator even when within range of the viewing means 14. The indicator may also be useful in actuating suitable alarms when there is no viewing means operator present.

Obviously many modifications and variations of the present invention are possible in the light of the above teachings. It is therefore to be understood that within the scope of the appended claims the invention may be practiced otherwise than as specifically described.

What is claimed is:

1. In a target detection and identification system of the type employing echo ranging means for transmitting signals and receiving echo signals from targets within a maximum range; means for transmitting IFF signals to challenge targets within said maximum range, identification signal transmitting means on said targets for transmitting identification signals and a distress signal of a certain characteristic, receiving means for receiving said distress and identification signals and common indicator means connected to said echo ranging means and said receiving means for indicating reception of said echo signals and said identification and distress signals from targets, the improvement comprising separate indicating means for receiving said identification and distress signals, and signal discriminating means included within said separate indicating means for allowing only said distress signals to be indicated.

2. The improvement of claim 1 wherein said signal discriminating means includes a coincidence circuit, said coincidence circuit comprising a coincidence tube having a first input connected directly from said receiving means and a second input connected through a delay line from said receiving means, and a pulse counter and a train counter serially connected between said coincidence circuit and said indicating means.

3. The improvement of claim 2 wherein said coincidence tube has a first grid connected to said receiving means, and a second grid connected to said delay line, said delay line being operable to delay the signal to said second grid in time equal to the time spacing of said signals such that said tube passes signals indicative of $N-1$ pulses, where $N=$number of pulses in a series.

4. The improvement of claim 3, wherein said pulse counter passes one pulse for $N-1$ pulses received and said train counter activates said indicating means when a predetermined number of pulses has been received from said pulse counter.

5. In a target detection and identification system of the type employing echo ranging means for transmitting signals out and receiving echo signals from targets within a maximum range, means for transmitting IFF signals to challenge targets within said maximum range, identification signal transmitting means on said targets for transmitting identification signals and a distress signal of a certain characteristic, receiving means for receiving said distress and identification signals, common indicator means including means for adjusting the range represented for examination connected to said echo ranging means and said receiving means for indicating reception of said echo signals and said identification and distress signals from targets within a predetermined range; the improvement comprising; separate indicating means connected to the means for receiving said identification and distress signals for indicating received distress signals of a certain characteristic comprising a series of short uniformly spaced signals from targets at any distance within the maximum range of the system when said range represented for examination is less than the maximum range of the system, and wherein said separate indicating means includes signal discriminating means for allowing only said distress signals to be indicated.

References Cited in the file of this patent

UNITED STATES PATENTS

| | | |
|---|---|---|
| 2,266,401 | Reeves | Dec. 16, 1941 |
| 2,412,974 | Deloraine | Dec. 24, 1946 |
| 2,494,339 | Keister | Jan. 10, 1950 |
| 2,537,102 | Stokes | Jan. 9, 1951 |
| 2,552,174 | Holloway | May 8, 1951 |
| 2,648,060 | Turner | Aug. 4, 1953 |
| 2,885,665 | Wolff | May 5, 1959 |

FOREIGN PATENTS

| | | |
|---|---|---|
| 618,519 | Great Britain | Feb. 23, 1949 |